Jan. 6, 1970   M. SIARD ET AL   3,487,501
APPARATUS FOR FINISHING BLOW-MOLDED HOLLOW PLASTIC ARTICLES
Filed Feb. 6, 1967   4 Sheets-Sheet 3
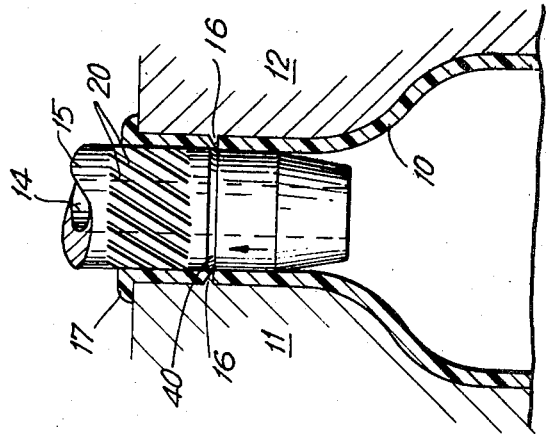
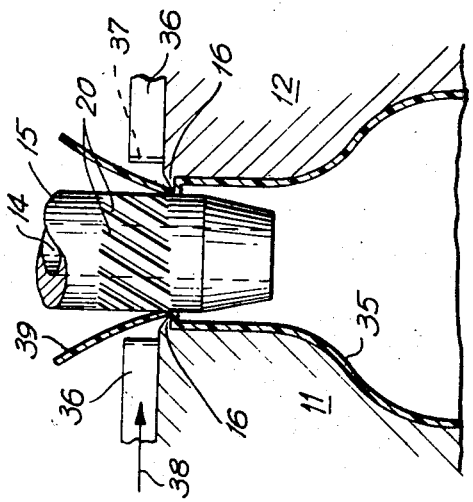
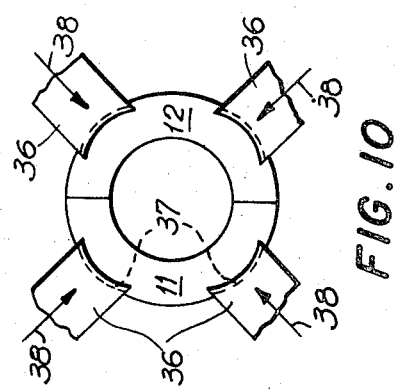
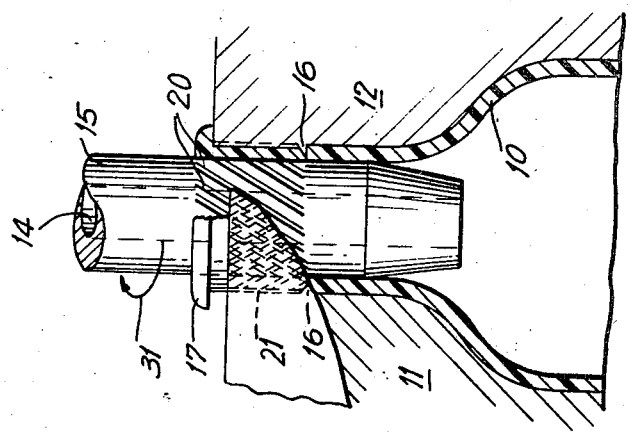
INVENTORS
MICHEL SIARD
DANIEL PELLERIN
BY
Curtis, Morris & Safford
ATTORNEYS

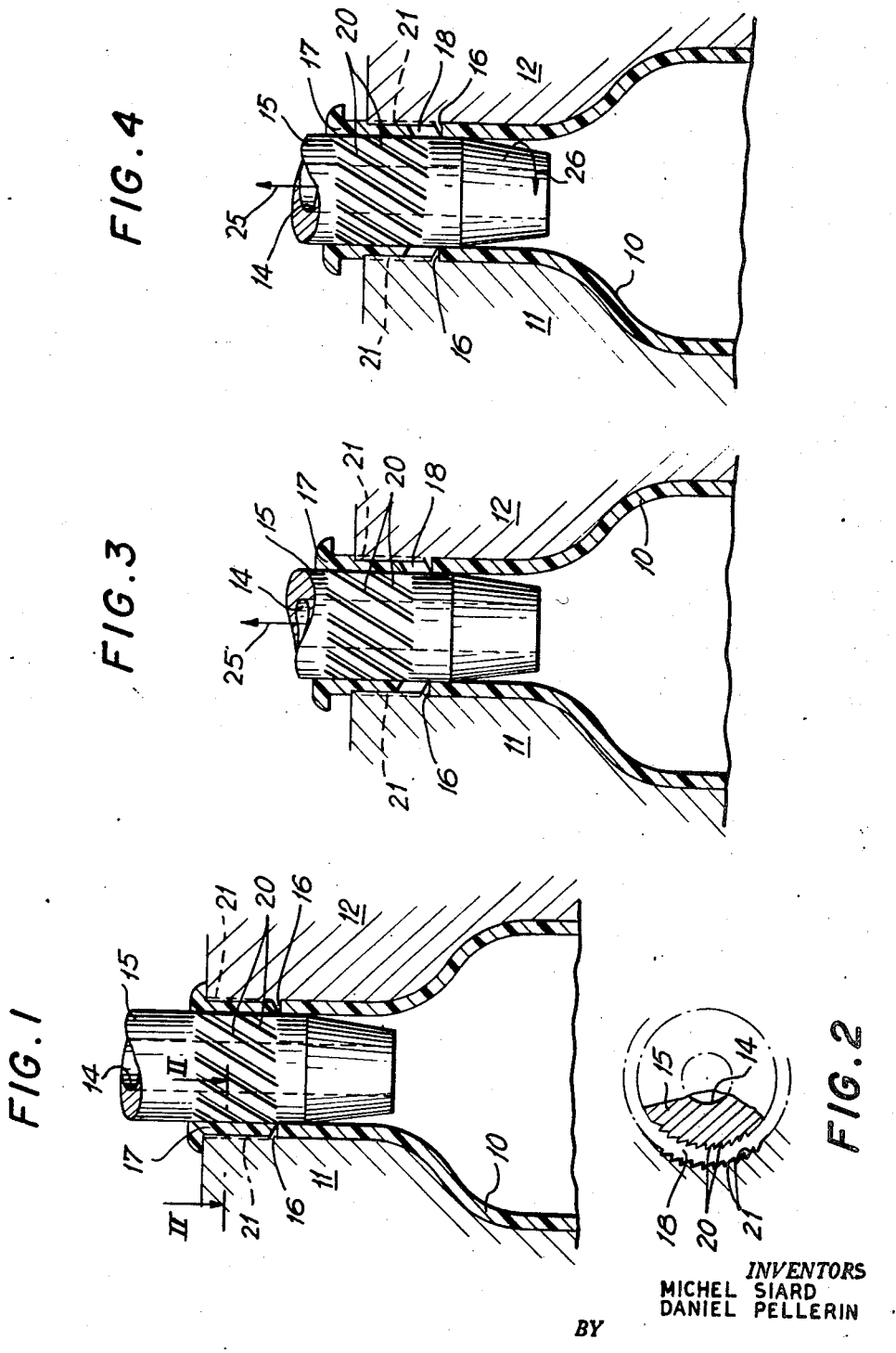

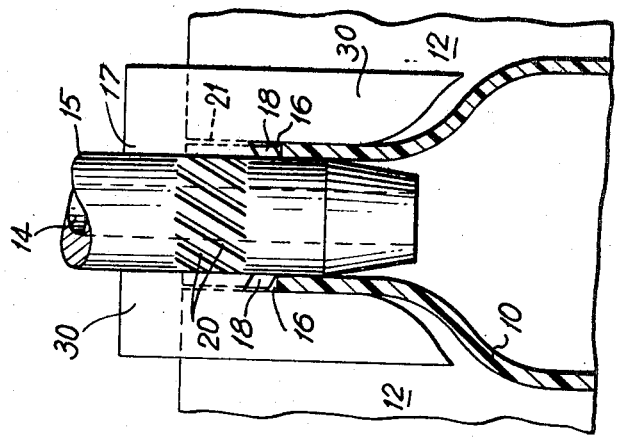
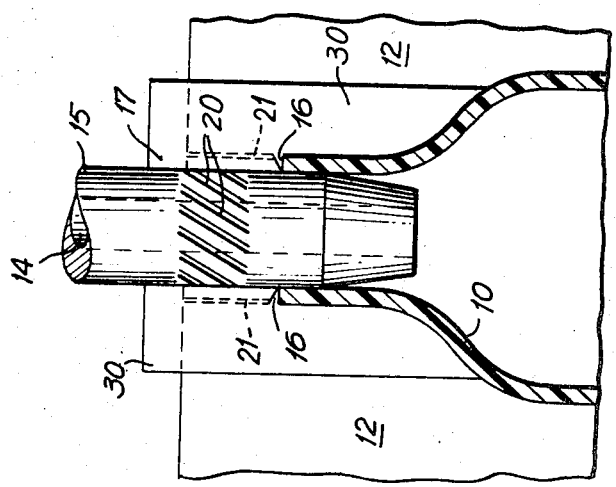
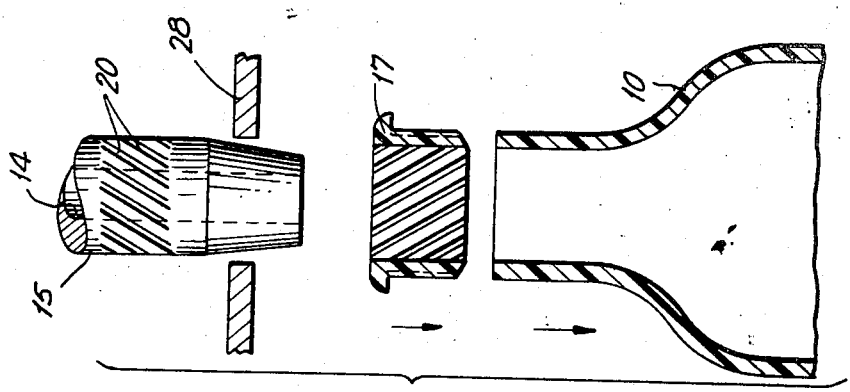

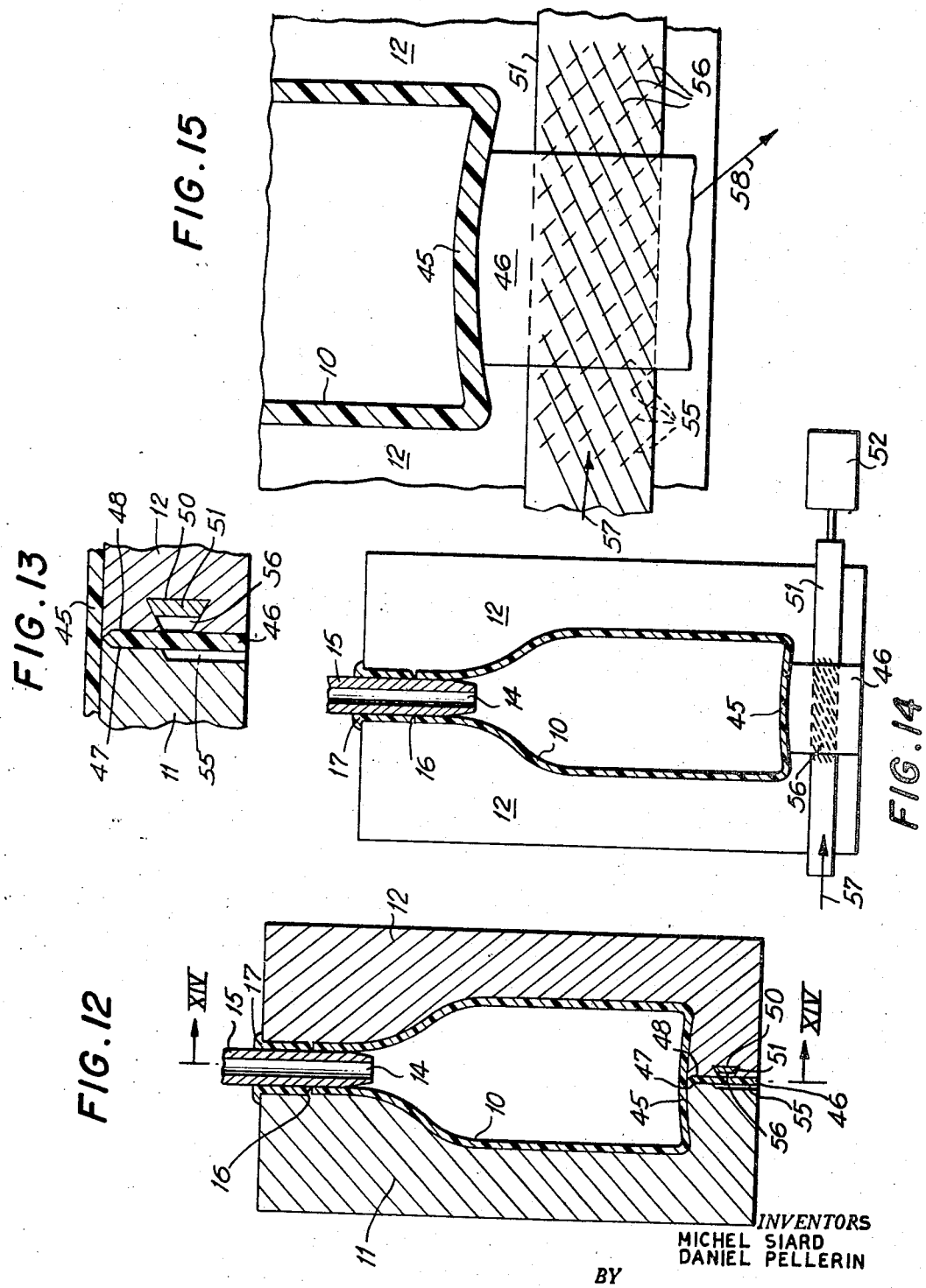

United States Patent Office 3,487,501
Patented Jan. 6, 1970

3,487,501
APPARATUS FOR FINISHING BLOW-MOLDED HOLLOW PLASTIC ARTICLES
Michel Siard, Sainte-Adresse, and Daniel Pellerin, Le Havre, France, assignors to Compagnie Francaise de Raffinage, Paris, France
Filed Feb. 6, 1967, Ser. No. 614,356
Claims priority, application France, Feb. 7, 1966, 48,712; Mar. 4, 1966, 52,147
Int. Cl. B29c 23/00; B29h 7/02
U.S. Cl. 18—5                                     6 Claims

ABSTRACT OF THE DISCLOSURE

When hollow plastic articles such as bottles are blow-molded in molds having a plurality of separable parts, an excess "tail" or "flash" is produced, particularly at the bottom and at the neck of the bottle, by plastic materials beyond the extent of the mold cavity, which excess must be cut off or removed in finishing the articles. Here such removal is accomplished without hand work and while the article is still in the mold, by pinching the "flash" between a movable and a stationary serrated surface and shearing or tearing the excess material away from the article upon movement of the one serrated surface with respect to the other.

---

This invention relates to the blow-molding of hollow articles, such as bottles and the like, from synthetic or plastic materials and, more particularly, to the finishing of such articles after blow-molding for removal therefrom of the excess "flash" formed during the molding thereof and especially around the open neck and at the bottom of such articles.

As will be understood, the conventional manufacture by so-called blow-molding techniques of hollow articles (such as bottles or other types of containers, toy and novelty items, machine parts, etc.) from thermoplastic synthetic or plastic materials (such as polyethylene, polystyrene, etc.) generally comprises forming (by injection molding or otherwise) a hollow and relatively thick-walled "preform" or parison of the final article, enclosing the parison of the final article, enclosing the parison in an openable mold defining the desired configuration of the final article while the parison is still hot enough for the plastic material thereof to be soft and flowing, and then blowing the parison with air or other gas introduced thereinto through a mandrel on which the parison was formed or otherwise until it expands to fill and conform to the shape of the mold cavity, after which and upon cooling of the blown article in the mold, the mold is opened and the article removed.

Considering as illustrative the blow-molding of a container shaped like a bottle, there is almost inevitably produced at the bottom of the bottle a "tail" or "flash" of excess plastic—either because some of the plastic was forced out between the bottom parting edges of the mold during blowing or, more generally, because the parison was originally produced as a long intestine-like tube from which each closing blow-mold pinched off a length suitable for making one bottle. Similarly, at the open neck of the bottle and around the blowing mandrel there is intentionally left an excess or "flash" of plastic material extending beyond what is intended to be the finished bottle top or neck.

After the blow-molding is completed, such bottom "tails" or "flash" and the neck or mouth "flash" (which term shall be used herein as meaning the excess portion which must be removed from either top or bottom after molding) must be removed to produce a suitable and finished article. Because of the economics of this industry today, virtually all such blow-molded hollow articles are mass-produced in highly automated machinery, and the cost margins involved do not admit of hand finishing or manually removing the flash excess portions. Indeed, it may even be considered undersirable from a cost standpoint merely to provide an additional operating stage, however automated, for removing such excess flash from the individual articles after they are removed from the molds, and especially because of the difficulty of maintaining a large plurality of such articles in any particular orientation in view of the extremely light weight thereof compared to the size of the articles.

If it is attempted to provide in or at the blow-mold itself means such as a moving serrated surface for chewing or tearing away such excess flash material, difficulty may be experienced in avoiding deposition or build-up of the softened plastic material in the serrated chewing surfaces and/or in providing synchronized means for cleaning such surfaces and/or, more importantly, the substantial difficulties and complications incident to integrating into complicated automated machinery additional synchronized movements of trimming or tearing apparatus correctly cycled with the movements of opening and closing the mold, introducing and withdrawing the blowing mandrel, etc.

According to this invention, however, apparatus are provided for removing such excess flash from both the bottom and the top or neck of blow-molded plastic articles while the articles are still in the mold, in order to avoid a separate or additional manual or mechanical finishing operation, and in a manner to which existing machinery can be readily adapted without complex change or re-designing, by generally providing opposed stationary and movable surfaces (such as the mandrel itself and the mold cavity at the top of the mold and opposed moving and stationary pinching surfaces at the bottom) having serrations thereon and arranged so that the flash is pinched or held between the serrated surfaces and sheared away in the finishing step by moving the movable serrated surface with respect to the stationary one. As a further feature of this invention, the particular orientation and configuration of the serrations of such finishing surfaces are arranged, with regard to the particular type of article being molded and the particular molding apparatus used, so as to remove the top flash upwardly out of the mold and/or eject the bottom flash downwardly from the article at a desired angle so that neither of these finishing operations interferes with the normal cycling of the molding machinery nor the manner of removing the finished article from the mold virtually regardless of which of the several different but conventional blow-mold apparatus designs is being considered.

With the foregoing and additional objects in view, this invention will now be more particularly described, and other objects and advantages thereof will be apparent from the following description, the accompanying drawings, and the appended claims.

In the drawings:

FIG. 1 is a somewhat diagrammatic view in axial section of apparatus embodying and for practicing this invention and showing the upper portion of a bottle-like container being blow-molded in a closed mold during the blowing thereof through a mandrel shown in place through the neck of the article;

FIG. 2 is a partial view in transverse section along the line II—II of FIG. 1, but with the blown article removed for clarity;

FIGS. 3 and 4 are views like FIG. 1 and illustrating the movement of the mandrel during severing and removal of the flash at the neck or top of the article being formed;

FIG. 5 is a further somewhat diagrammatic view after opening of the mold in FIG. 1 and illustrating particularly the separation and removal of the undesired flash and the finished article from the mold and the mandrel;

FIGS. 6 and 7 are views similar to FIG. 1 but taken on a vertical plane turned 90° from FIG. 1 and along the parting between mold parts, and illustrate the application of the invention to the situation where an extremely large article is being formed from a large parison resulting in the formation of additional excess flash at the neck of the article and the removal thereof in accordance herewith along with the initial flash shown in FIGS. 1–5;

FIG. 8 illustrates a further view, similar to FIG. 1, showing a particular orientation of grooves especially adapted for use with the blow-molding of especially large articles by a "mandrel projection" technique in which the blow-mold is closed upon the parison before the blowing mandrel is inserted therein;

FIGS. 9 and 10 illustrate apparatus embodying and for practicing this invention and particularly adapted to the blow-molding of hollow articles having relatively thinner walls than is usual, with FIG. 10 being a diagrammatic top plan view of the apparatus shown in FIG. 9 with the mandrel and molded article being removed for clarity;

FIG. 11 is a further view, similar to FIG. 1, illustrating a preferred disposition and construction of a mandrel embodying and for practicing this invention especially adapted for cooperation with shearing or cutting edges on the blow-mold;

FIG. 12 is a somewhat diagrammatic view in axial section of a blow-mold for blowing a bottle-shaped container embodying and for practicing this invention and particularly illustrating the removal of the bottom flash or "tail" from the molded article, with a blow-mold being shown closed during the blowing of the article;

FIG. 13 is a partial view on a larger scale of the flash-removing mechanism illustrated at the bottom of FIG. 12;

FIG. 14 is a somewhat diagrammatic axial section of the arrangement of FIG. 12 and taken on the line XIV—XIV thereof; and FIG. 15 is a diagrammatic view on a larger scale but in the same plane as FIG. 14, illustrating particularly a preferred orientation and configuration of the serrations on stationary and moving surfaces embodying and for practicing this invention in the removal of the bottom flash or "tail" from the blown article.

Although, as will be understood, this invention is readily applicable to a wide variety of blow-molded plastic articles, it will be convenient to describe the invention, merely as illustrative, in connection with blow-molded plastic bottles or jugs or similarly shaped containers, especially since such articles probably comprise the largest quantity of blow-molded hollow articles produced today. As noted above, the economics of the industry virtually demand the utilization of one or another of conventional varieties of highly automated mass production machinery.

The normal operation of such machinery in its intended manner produces the excess flash which must be removed in one way or another from both bottom and top or neck of the blown bottle. Obviously, it is undesired that this should be a manual operation with each of thousands of bottles, but it may also be undesirable for the removal of such flash to necessitate a separate mechanical operation, however much automated, and particularly when, as here, it is desired to accomplish the flash removal with apparatus of great simplicity which can be incorporated in various different existing machines or molding devices.

In accordance with this invention, for example, the flash removal from the neck of the bottle is accomplished by cooperation between the blowing mandrel and the mold cavity surfaces without the interposition of additional moving parts or extra automatic operations because the blowing mandrel and mold cavity surfaces and relative movement thereof are necessary in any event. The utilization thereof in accordance herewith provides a distinct advantage over any additional mechanical or manual operation on the molded article after removal from the mold.

That is, the mandrel, in most machine designs, is movable in any event, so that a simplicity of manufacture is achieved by utilizing it in accordance herewith for the removal of the flash at the neck or opening of the bottle. Even in specialized situations (e.g., as illustrated in FIGS. 9 and 10) the ancillary mechanism is readily applied to existing machines without interrupting or changing the normal cycle of operation of the opening and closing of the molds.

Similarly, regarding the flash at the bottom of the bottle, the removal thereof in accordance herewith is accomplished by the incorporation of but a single moving part into the standard blow-mold apparatus. Also, regarding both the bottom and top flash, the removal thereof is accomplished in accordance herewith in a manner which directs the ejected or removed flash as may be desired and so as not to interfere with whatever automated conveyor or other equipment is normally utilized to accept and handle the finished bottles after the opening of the blow-mold.

Generally in accordance herewith, when the mold closes on the parison (or that part of the parison which will produce the flash to be removed), it is gripped between pinching pressure surfaces of the mold or between the mold cavity surfaces and the blowing mandrel. By providing such surfaces with serrations to bite into the flash-producing portion of the plastic material from the parison and arranging, after solidification and cooling of the blown article, to move one of those serrated surfaces with respect to the other, the flash is sheared off at the conventional mold cutting edges, and in a manner which can readily be applied to almost any of the wide variety of blow-molds and blow-molding apparatus now in use. By arranging the orientation of the opposed serrations with respect to the axis and direction and movement (and preferably in a manner where the serrations on one surface are differently orientated than those on the opposed surface), not only is the desired shearing or tearing action provided for removal of the flash, but also the direction of ejection of the removed flash is suitably controlled to avoid interfering with other portions of the apparatus and/or subsequent automatic conveying or handling equipment.

Referring to the drawings, which illustrate somewhat diagrammatically preferred embodiments of apparatus for practicing this invention as automated blow-molding apparatus for producing a plastic bottle and in which like characters of reference refer to like parts throughout the several views thereof, there is illustrated in FIG. 1 a hollow body in the form of a bottle 10 being blow-molded in the mold cavity formed by half-molds 11 and 12 which are separable in known manner and by conventional arrangements not shown here. For simplicity, only the top portion of the mold parts 11 and 12 and the molded article 10 are shown as illustrating the removal of flash from the neck or top of the bottle, the removal of flash from the bottom being described in more detail below in connection with FIGS. 12–15.

At the time illustrated in FIG. 1, the original parison has been substantially completely blown to form article 10 (all in known manner) by passing compressed air through passage 14 in a mandrel 15 inserted into the mouth of the mold and the parison. The desired finished top of molded article 10 is defined by cutting edges 16 formed in the mold cavity, and the flash desired to be removed hereby is that portion 17 of the plastic material above and beyond cutting edges 16, which portion was originally trapped or pinched between the closing mold parts 11 and 12 and mandrel 15 in a clearance space 18 therebetween (FIG. 2).

The outer surface of mandrel 15 axially in the area of flash 17 (i.e., above and outwardly of cutting edges 16) is provided with a plurality of ridges or serrations 20, preferably arranged in an inclined or helical manner around mandrel 15, while the opposed surfaces of mold parts 11 and 12 are also provided with a plurality of ridges or serrations 21, which are helically arranged (with the direction of inclination opposite to that of serrations 20 on mandrel 15) or generally parallel to the axis of mandrel 15, in accordance with the considerations discussed in more detail below.

Thus, when the two halves of the mold 11 and 12 are closed or brought together on the original parison, at the beginning of the blowing cycle of the machine, that part of the parison forming the flash 17 at the neck or opening of the bottle 10 is caught or pinched between the area of mandrel 15 having serrations 20 thereon and the area of the neck portion of the mold cavity 11–12 having serrations 21 thereon—i.e., in clearance space 18 between mandrel 15 and mold parts 11 and 12—and is held there pinched between mandrel 15 and mold parts 11 and 12 during blowing of the parison to form the hollow article 10. After blowing of the article 10 to its full extent, and the solidification and cooling thereof in conventional manner with whatever apparatus is being used, and prior to separating mold parts 11 and 12 to eject the blown article, mandrel 15 is moved axially outwardly in the direction of arrow 25 (FIG. 3) and given a rotational movement in the direction of arrow 26 (FIG. 4) by conventional drive mechanism (not shown).

By virtue of serrations 20 and 21 on mandrel 15 and the neck portion of mold parts 11 and 12, such movement of mandrel 15 produces a shearing or tearing action on flash portion 17 to disengage it completely from blown article 10 along the line of cutting edges 16 and to withdraw flash 17 on mandrel 15 upwardly out of the mold 11–12, with the extent of shearing action and direction of removal of flash 17 being determined principally by whether serrations 21 on mold parts 11 and 12 are helically disposed or arranged parallel to the axis of mandrel 15. In any event, and in order for serrations 20 and 21 to "bite" into the softened parison material forming flash 17, they are both preferably arranged as the saw-tooth structure indicated in FIG. 2. Similarly, the extent of rotation of mandrel 15, as indicated by arrow 26, in timed relation with the withdrawal thereof from the mold, as indicated by arrow 25, is selected and correlated with the particular material being blown, the temperature thereof at the time the mold is about to be opened, the wall thickness, and similar considerations, all of which are well understood by men skilled in this art without further experimentation.

Upon withdrawing mandrel 15 completely from the mold and the separation of mold parts 11–12 for ejection of the finished article 10 (all depending upon the particular cycle of the blow-molding apparatus being used), mandrel 15 is withdrawn through a stationary ejector 28 (FIG. 5) which strips flash portion 17 from mandrel 15 and allows it to fall or be discarded as desired and in a manner which does not interfere with whatever automated or other conveyor or receiving apparatus is provided for receiving blown article 10 from mold 11–12 after the opening thereof, as will be understood, and thus to free mandrel 15 for reinsertion into another parison for blowing another article in the next cycle of utilization of the same mold parts 11–12.

As will be apparent from the foregoing, and as noted above, the satisfactory practicing of this invention for removal of the flash 17 at the neck of the article necessitates virtually no apparatus beyond that which is normally embodied in blow-molding machinery, satisfactory results being achieved merely by a relatively simple modification of existing or conventional apparatus to provide for imparting the desired rotational movement to mandrel 15 and the serrations 20 and 21 thereon and on mold parts 11 and 12. Thus, no extra parts are utilized and, even, the moving cycle is not notably different from conventional apparatus since the mandrel is normally withdrawn from the mold upon opening thereof in any event.

Nevertheless, by utilizing the serrations 20 and 21 and a rotational movement of mandrel 15 upon withdrawing thereof, the desired shearing action against cutting edges 16 is achieved as or immediately before a mold is opened and without notably interrupting the conventional automated blow-molding cycle, and the flash portion 17 is adequately removed and disposed of without interfering with either the normal cycling of the automated blow-molding apparatus or whatever subsequent handling or conveying arrangements are provided for receiving and conveying the finished molded article 10. Thus, in essence, operations embodying and for practicing this invention provide a finished molded article 10 upon opening of the blow-mold parts and without additional finishing operations of either a manual or mechanical nature elsewhere in the plant or in the apparatus.

As also will be apparent, satisfactory results are achieved in accordance herewith in both the blow-molding of relatively small bottles from relatively small parisons and the blow-molding of substantially larger containers from thick-walled parisons or larger containers having substantially thinner walls. For example, in the blowing of relatively large containers from a parison having relatively thick walls, there may be produced at the neck portion of the container (merely because of the extra amount of plastic material in the parison and the longer blowing time required to produce a bottle of one liter capacity or that the size of a gallon jug) so-called "ears" of extra flash between the parting surfaces of the mold halves and adjacent the neck or opening flash.

Such situation is illustrated in FIGS. 6 and 7 in which the "ears" 30 are shown connected to the central flash portion 17. In this particular situation, it is preferred that the serrations 21 in the neck portion of the mold halves 11 (not shown) and 12 be substantially axially directed and parallel so that the rotational movement of mandrel 15 and the withdrawal thereof from the mold, upon separation of mold halves 11 and 12, will succeed in shearing or tearing the flash portion 17 away from the molded article 10 along the cutting edges 16, but will not shear or tear the "ears" 30 from their connection with the flash portion 17 so that the entire excess flash or waste may be withdrawn from the opening mold on mandrel 15 as a unit.

Also, yet a further situation arises with the use of conventional blow-molding apparatus in the formation of bottles or other containers of a wide variety of sizes, and with which satisfactory results are obtained according to this invention in the removal of the inevitable flash from the neck or open portion of the molded article. Thus, a blow-molding procedure may be utilized (sometimes known as "mandrel projection") in which the mold halves are closed on the parison before introduction of the blowing mandrel into the parison or the mold. Such techniques are usually utilized in the production of fairly large containers, and in two varieties—i.e., those containers which have a normal weight of plastic material therein, and those containers having extremely thin walls and weighing, for example, no more than 10 to 15 gms. for a container having a capacity of one liter.

In the first case (containers of normal weight and wall thickness), the preferred utilization of this invention and the advantages thereof are achieved with the apparatus as described above but with the serrations 21 on the internal surfaces of mold parts 11 and 12 being oriented or disposed primarily in the helical configuration of serrations 20 on mandrel 15 (as illustrated in FIG. 8). In this arrangement, and with a rotational movement of mandrel 15 in the direction of arrow 31 immediately prior or substantially simultaneously with the longitudinal withdrawing movement thereof upon opening of the mold parts 11 and 12, there is facilitated a separation and withdrawing of the flash 17 along the cutting edges 16 despite the fact that the wall thickness of both the parison and the molded article 10 may be greater and despite the fact that the softened parison may not immediately have been gripped between serrations 21 on mold parts 11 and 12 and serrations 20 on mandrel 15 upon initially closing the mold.

In the case of molding articles having extremely thin walls from thin-walled parisons (as illustrated in FIGS. 9 and 10) where the mandrel is interjected after closing the mold and where the wall thickness of the blown article is so slight that virtually instantaneous solidification occurs upon contact of the article with the cool walls of the mold cavity, it may be difficult to provide a clearance between mandrel 15 and mold parts 11 and 12 which will avoid contact with the plastic material until blowing is completed. In such event, it may not be practical to provide for initially pinching the softened parison between the serrations 21 of mold parts 11 and 12 and serrations 20 on mandrel 15, and an alternative arrangement is preferred for dispensing with the flash in such thin-walled containers.

As indicated in FIGS. 9 and 10, accordingly, mold parts 11 and 12 terminate with cutting edges 16 intended to define the upper surface of the finished article, indicated as a thin-walled molded article 35. On the upper surface of mold parts 11 and 12 are arranged a plurality of sliding elements 36 having arcuate inner ends comprising serrations 37 oriented substantially like serrations 21 in the stationary internal surfaces of mold parts 11 and 12 as discussed above.

In this situation, when the mandrel 15, including external serrations 20 as described above, is inserted into the parison and the complete thin-walled article 35 is blown, members 36 are moved radially inwardly (by known mechanism not shown) in the direction of arrows 38, to engage flash portions 39 of the remaining parison and blown article against serrations 20 of mandrel 15 to provide for the shearing or tearing away of flash portions 39 against cutting edges 16 as in the arrangements previously described and the removal of such flash portions with mandrel 15 upon extraction thereof from the mold and opening of the mold halves 11 and 12.

As a further feature of this invention, and as indicated in FIG. 11, the continued retraction of mandrel 15 across the points of cutting edges 16 might produce an excessively rapid wear of the latter. For this reason, a preferred construction in accordance herewith includes the provision of a groove or conical recessed surface 40 around mandrel 15 in the axial area of cutting edges 16. In this manner, rotation of mandrel 15 for the shearing action at cutting edges 16 does not produce extra wear thereof, and the axial extent of groove or conical surface 40 is specifically selected and oriented with the cycling of the entire apparatus so that mold halves 11 and 12 are opening slightly before mandrel 15 is withdrawn past cutting edges 16 to an extent greater than groove or conical surface 40.

Turning attention now to the "tail" or flash produced at the bottom of a bottle or other hollow article by closing mold parts 11 and 12 on the tail end of the parison or otherwise, reference will be made to FIGS. 12–15. Thus, in FIG. 12 there is shown, in substantially the same diagrammatic fashion as in FIG. 1, two mold parts 11 and 12 closed together while a parison, previously inserted therebetween, is being blown into bottle 10 by air forced through channel 14 in mandrel 15 inserted into the neck portion of the mold and the parison, and showing flash 17, above cutting edges 16, which will be removed in accordance with the above description.

At the bottom 45 of bottle 10 and the mold cavity formed between mold halves 11 and 12, there is produced a "tail" or flash 46, pinched or held between opposed pinching surfaces 47 and 48 of mold parts 11 and 12. In a groove 50 formed in mold part 12, there is provided a sliding bar 51 for transverse back-and-forth sliding movements under the control of a feed screw or other conventional driving device indicated generally at 52. Serrations 55 are provided on a portion of stationary pinching surface 47 on mold part 11, while corresponding serrations 56 are provided on the opposed face of sliding bar 51.

Thus, as will be apparent from the foregoing, when mold parts 11 and 12 close upon an end portion of the original parison, bottom flash or "tail" 46 is formed. After the blowing of the parison into the form of article 10 within the mold is completed and the finished article cooled (which may require, in known manner and with conventional apparatus, cooling of the mold, including the bottom portion thereof) and just a moment prior to the time when the mold is opened to release the finished article 10, sliding bar 51, under the action of its drive mechanism 52, is moved laterally in the direction of arrow 57 (FIGS. 14 and 15) so that serrations 56 on sliding bar 51 and biting into flash 46, tear or shear off the flash at the meeting point of pressure surfaces 47–48 of mold parts 11–12.

In this manner, the bottom flash 46 is sheared or torn from the finished article 10 while still in the mold but without interrupting the normal cycling of the apparatus, and this is accomplished by changing the conventional mold with no more than the addition thereto of a slot or groove 50 in which may operate sliding bar 51 with the serrations 56 thereon. As will be understood from the foregoing, the extent of oblique angle of serrations 56 (and that of serrations 55 on the stationary surface 47 of mold part 11) is primarily indicated by the particular plastic material being utilized and, of course, the thickness and tenacity of flash 46. Preferably, the serrations 56 on sliding bar 51 are at a relatively oblique angle (as indicated purely diagrammatically by the lines in FIGS. 14 and 15), whereas the serrations 55 on stationary surface 47 of mold part 11 may be either parallel to the axis of sliding bar 51 or oblique in a contrary direction, as indicated by the dotted lines on FIG. 15, in which event the sheared off flash 46 will normally drop at an angle in the direction of arrow 58 in FIG. 15, thus to miss becoming entangled with ancillary conveying or other portions of the apparatus, as may be desired.

As will be understood, the particular dimensions of the moving and stationary serrations 56 and 55, as well as the respective or opposed angles thereof, are primarily dictated by the nature of the plastic material being treated and the size of flash 46, and completely within the skill of the art without further experimentation. It is to be understood, however, that such serrations should be selected to avoid an excessive power requirement for the movement of sliding bar 51 and shearing of flash 46, as well as regarding the direction in which it is desired to have sheared flash 46 drop away from mold parts 11 and 12 to avoid becoming entangled in other portions of the apparatus. As with the comparable serrations before described at the neck or mouth of the mold and molded article, a saw-tooth configuration is preferred for serrations 55 and 56 so that they may obtain a good "bite" into the softened plastic material initially pressed between them.

Accordingly, as will be apparent from the foregoing, there are provided herewith techniques and apparatus for removing the excess flash from both the mouth or neck of a blow-molded article around the blowing mandrel and from the opposite or bottom end thereof, and in a manner which requires substantially little or no additional apparatus added to any of a variety of conventional blow-molding machines and which does not intrude into the normal synchronizing cycling movements of the mandrel and mold parts. Essentially, such advantages are accomplished by pinching the flash portions between serrated surfaces during closing of the mold on the parison and then shearing or tearing the flash away by movement of one of the pinching serrated surfaces with respect to the other. With the removal of flash at the top of the article, generally, neither additional mechanism nor even the provision of substantial additional movement of the usual parts are necesary since the mandrel is inserted and withdrawn in any event and the parison is usually pressed against it, so that the advantages are obtained by providing serrated surfaces on the already existing mandrel and mold cavity parts, although the particular selection of the disposition and configuration of such cooperating serrated surfaces is important here. With the bottom flash, the only necessary moving part in accordance herewith is the one sliding bar operating in a cavity in one mold part, with the particular cooperating orientation of serrations accomplishing the desired result. In all events, operations in accordance with this invention satisfactorily remove the excess flash as desired, and completely while the blown article is still in the mold, without requiring either handwork or an additional mechanical operation or station as conventional hitherto, and without requiring complex or expensive redesigning of existing types of blow-molding machines.

While the methods and apparatus described herein form preferred embodiments of this invention, this invention is not limited to these precise methods and apparatus, and changes may be made therein without departing from the scope of this invention.

What is claimed is:

1. In blow-molding apparatus for the production of hollow plastic articles by the blowing of a softened and fluent parison of said article enclosed within separable mold parts to produce said hollow article as defined by said mold parts and in which said blowing is accomplished by injection of a fluid through a passage in a blowing mandrel inserted into said parison within said mold parts, the improvement in said apparatus for removing excess flash from said blow-molded article around an opening of said article prior to removal of said article from said mold parts, which comprises in combination means for positioning an opening portion of said parison for pinching engagement with a movable means against an opening portion of said separable mold parts beyond and outside the portion thereof which defines the final configuration of said blown hollow article, said pinching engagement of said parison portion being between an opening surface of at least one of said mold parts and a surface rotatingly and reciprocatingly movable with respect thereto, sawtooth serrations on both said movable and said separable mold surfaces for opposed biting engagement with said parison portion pinched therebetween, cooperating cutting edges on said separable mold parts for defining the outer extremities of said blown hollow article and against which said excess flash is to be removed, and means for moving said movable surface and said serrations thereon with respect to said stationary surface and said serrations thereon for shearing and tearing said excess flash away from said blown article at said cutting surfaces.

2. Apparatus as recited in claim 1 in which said mandrel also includes circumferential groove axially positioned adjacent said cutting edges on said mold parts when said mold parts are closed, said groove having an axial extent sufficient to avoid contact with said cutting edges upon axial movement of said mandrel during any time when said mold parts are closed together.

3. Apparatus as recited in claim 1 and particularly adapted for removing said excess flash from said molded article adjacent said blowing mandrel which includes sawtooth serrations on the outer surface of said blowing mandrel for biting engagement with said flash to be removed, a plurality of slide blocks on said separable mold parts for radial movement toward and away from the outer circumference of said flash to be removed, and means for moving said slide blocks radially inwardly to pinch said flash to be removed against said serrations on said mandrel for shearing and tearing said flash away from said blown article at said cutting edges of said mold parts upon angular and axial movement of said mandrel.

4. Apparatus as recited in claim 1 in which said serrations are inclined helically to the axis of said mandrel.

5. Apparatus as recited in claim 4 in which said serrations on said stationary mold part surfaces are substantially parallel to the axis of said mandrel.

6. Apparatus as recited in claim 4 in which said serrations on said stationary mold part surfaces are inclined at an angle to the axis of said mandrel but opposite to the angle of inclination of said serrations on said mandrel.

References Cited

UNITED STATES PATENTS

| 2,733,736 | 2/1956 | McLaughlin | 225—102 X |
| 3,031,718 | 5/1962 | Adams. | |
| 3,209,400 | 10/1965 | Di Settembrini. | |
| 3,295,159 | 1/1967 | Fischer. | |
| 3,363,282 | 1/1968 | Hagen | 264—94 X |
| 3,369,272 | 2/1968 | Martin et al. | 264—98 X |

FOREIGN PATENTS 737,376   6/1966   Canada.

ROBERT F. WHITE, Primary Examiner

T. J. CARVIS, Jr., Assistant Examiner

U.S. Cl. X.R.

264—94, 161, 163